United States Patent
Miyazaki

(10) Patent No.: US 9,567,407 B2
(45) Date of Patent: Feb. 14, 2017

(54) METHOD FOR PRODUCING EPOXIDIZED NATURAL RUBBER, RUBBER COMPOSITION FOR TIRES, AND PNEUMATIC TIRE

(71) Applicant: SUMITOMO RUBBER INDUSTRIES, LTD., Kobe-shi, Hyogo (JP)

(72) Inventor: Sumiko Miyazaki, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 14/379,148

(22) PCT Filed: Mar. 7, 2013

(86) PCT No.: PCT/JP2013/056314
§ 371 (c)(1),
(2) Date: Aug. 15, 2014

(87) PCT Pub. No.: WO2013/133380
PCT Pub. Date: Sep. 12, 2013

(65) Prior Publication Data
US 2015/0031840 A1    Jan. 29, 2015

(30) Foreign Application Priority Data
Mar. 8, 2012  (JP) ................................ 2012-052149

(51) Int. Cl.
*C08C 19/06* (2006.01)
*C08L 15/00* (2006.01)
*B60C 1/00* (2006.01)

(52) U.S. Cl.
CPC ................ *C08C 19/06* (2013.01); *B60C 1/00* (2013.01); *B60C 1/0016* (2013.04); *C08L 15/00* (2013.01)

(58) Field of Classification Search
None
See application file for complete search history.

(56) References Cited

U.S. PATENT DOCUMENTS

| | | | | |
|---|---|---|---|---|
| 4,297,298 A | * | 10/1981 | Crommelynck | C07C 409/26 562/3 |
| 5,879,584 A | * | 3/1999 | Bianchetti | C07C 407/00 252/186.23 |
| 5,977,403 A | * | 11/1999 | Byers | C07C 407/00 562/4 |
| 2011/0253285 A1 | | 10/2011 | Ichikawa et al. | |

FOREIGN PATENT DOCUMENTS

| | | | |
|---|---|---|---|
| CN | 101942043 A | | 1/2011 |
| GB | 561180 | * | 8/1942 |
| JP | 6-329702 A | | 11/1994 |
| JP | 2004-176013 | * | 6/2004 |
| JP | 2004-176013 A | | 6/2004 |
| JP | 2008-094768 | * | 4/2008 |
| JP | 2009-293011 A | | 12/2009 |
| JP | 2010-138360 A | | 6/2010 |
| JP | 2011-079978 A | | 4/2011 |
| JP | 2011-79978 A | | 4/2011 |

OTHER PUBLICATIONS

English translation of JP 2008-094768 (2008).*
English translation of JP 2004-176013 (2004).*
International Search Report issued in PCT/JP2013/056314, mailed on Jun. 4, 2013.
Journal of Sichuan University (Natural Science Edition), vol. 38, No. 1, Feb. 2001, pp. 82-86.

* cited by examiner

*Primary Examiner* — Robert C Boyle
(74) *Attorney, Agent, or Firm* — Birch, Stewart, Kolasch & Birch, LLP

(57) ABSTRACT

The present invention provides a method for producing epoxidized natural rubber with high productivity and at low cost, a rubber composition for a tire containing the epoxidized natural rubber, and a pneumatic tire formed from the rubber composition for a tire. The present invention relates to a method for producing epoxidized natural rubber, the method including: step (1) of reacting an acid anhydride with hydrogen peroxide to prepare an organic peracid; and step (2) of epoxidizing natural rubber latex with the obtained organic peracid.

5 Claims, No Drawings

METHOD FOR PRODUCING EPOXIDIZED NATURAL RUBBER, RUBBER COMPOSITION FOR TIRES, AND PNEUMATIC TIRE

TECHNICAL FIELD

The present invention relates to a method for producing epoxidized natural rubber, and a rubber composition for a tire, and a pneumatic tire, which include the epoxidized natural rubber produced by the production method.

BACKGROUND ART

Epoxidized natural rubber has been conventionally used for rubber products such as tires. Epoxidized natural rubber is prepared, for example, by a production method includes: adding hydrogen peroxide and either formic acid or acetic acid to natural rubber latex stabilized with a surfactant; reacting the resulting performic acid or peracetic acid formed in the latex with the natural rubber for epoxidation; and coagulating, neutralizing, washing, and drying the latex, as needed.

For example, Patent Literature 1 discloses a method for producing epoxidized natural rubber by mixing acetic acid, hydrogen peroxide, and sulfuric acid (a catalyst), allowing the mixture to stand at 40° C. for about 1 to 2 days to prepare peracetic acid, and reacting the obtained peracetic acid with natural rubber latex.

Unfortunately, the above method requires a long time (i.e. 1 to 2 days) to prepare peracetic acid, and thus the epoxidized natural rubber productivity is poor. In addition, the reaction temperature has to be controlled at 40° C., which unfortunately results in high cost for temperature control.

CITATION LIST

Patent Literature

Patent Literature 1: JP-A 2009-293011

SUMMARY OF INVENTION

Technical Problem

The present invention aims to solve the above problems and provide a method for producing epoxidized natural rubber with high productivity and at low cost, a rubber composition for a tire containing the epoxidized natural rubber, and a pneumatic tire formed from the rubber composition for a tire.

Solution to Problem

The present invention relates to a method for producing epoxidized natural rubber, the method including: step (1) of reacting an acid anhydride with hydrogen peroxide to prepare an organic peracid; and step (2) of epoxidizing natural rubber latex with the obtained organic peracid.

Step (1) preferably includes mixing the acid anhydride and the hydrogen peroxide together to prepare the organic peracid, or alternatively preferably includes adding dropwise the acid anhydride to the hydrogen peroxide to prepare the organic peracid.

The acid anhydride is preferably acetic anhydride, and the organic peracid is preferably peracetic acid.

The epoxidized natural rubber preferably has a degree of epoxidation of 0.5 to 12 mol %, and the hydrogen peroxide preferably has a concentration of not more than 20% by mass.

The present invention relates to an epoxidized natural rubber produced by the production method.

The present invention relates to a rubber composition for a tire containing the epoxidized natural rubber.

The present invention also relates to a pneumatic tire formed from the epoxidized natural rubber.

Advantageous Effects of Invention

The present invention provides a method for producing epoxidized natural rubber, the method including: step (1) of reacting an acid anhydride with hydrogen peroxide to prepare an organic peracid; and step (2) of epoxidizing natural rubber latex with the obtained organic peracid. Thus, this method allows epoxidized natural rubber to be produced with high productivity and at low cost, compared to conventional production methods.

Specifically, according to the present invention, the heat of reaction between hydrogen peroxide and an acid anhydride such as acetic anhydride can be employed, which allows for preparing an organic peracid such as peracetic acid at a low temperature. Moreover, the organic peracid can be produced in a short time, which results in a significant reduction in reaction time and therefore a remarkable cost reducing effect. Furthermore, the produced epoxidized natural rubber latex or epoxidized natural rubber has a quality equivalent to that obtained by conventional production methods, and the present invention is also applicable to processes for continuous synthesis.

DESCRIPTION OF EMBODIMENTS

The present invention provides a method for producing epoxidized natural rubber, the method including: step (1) of reacting an acid anhydride with hydrogen peroxide to prepare an organic peracid; and step (2) of epoxidizing natural rubber latex with the obtained organic peracid.

In step (1), an acid anhydride is allowed to react with hydrogen peroxide to prepare an organic peracid. The acid anhydride is preferably an organic acid anhydride. Suitable examples thereof include organic acid anhydrides represented by the formula shown below. In such cases, the synthesis of an organic peracid can be carried out at a low temperature in a short time.
RCOOCOR
where Rs are the same or different and each represents an optionally substituted hydrocarbon group.

Examples of the optionally substituted hydrocarbon group R include aliphatic hydrocarbon groups, aromatic hydrocarbon groups, and alicyclic hydrocarbon groups. The hydrocarbon group R preferably has 1 to 6 carbon atoms, more preferably 1 to 4 carbon atoms, and still more preferably 1 or 2 carbon atoms. Examples of the substituents include any of hydrocarbon groups and halogen groups.

Specific examples of the acid anhydride include aliphatic carboxylic anhydrides such as acetic anhydride, propionic anhydride, isobutyric anhydride, butyric anhydride, 2-methylbutyric anhydride, pivalic anhydride, isovaleric anhydride, valeric anhydride, 2-methylvaleric anhydride, 3-methylvaleric anhydride, 4-methylvaleric anhydride, hexanoic anhydride, 2-methylhexanoic anhydride, 3-methylhexanoic anhydride, 4-methylhexanoic anhydride, 5-methylhexanoic anhydride, heptanoic anhydride, 2-methylheptanoic anhydride, 3-methylheptanoic anhydride, 4-methylheptanoic anhydride, 5-methylheptanoic anhydride, 6-methylheptanoic anhydride, 3-phenylpropionic anhydride, phenylacetic anhydride, methacrylic anhydride, acrylic anhydride, trichloroacetic anhydride, trifluoroacetic anhydride, tetrahydrophthalic anhydride, succinic anhydride, maleic anhydride, itaconic anhydride, and glutaric anhydride; and aromatic carboxylic anhydrides such as benzoic anhydride, phthalic anhydride, trimellitic anhydride, pyromellitic anhydride, and naphthalic anhydride. These may be used alone or in combination of two or more.

The hydrogen peroxide is not particularly limited. For example, it may be any commercially available hydrogen peroxide aqueous solution. The concentration of the hydrogen peroxide aqueous solution is not particularly limited. Yet, in terms of reaction stability, the concentration is preferably not more than 20% by mass, and more preferably ranges from 10 to 20% by mass. If the concentration is less than 10% by mass, then reaction efficiency may be reduced.

The method for reacting an acid anhydride with hydrogen peroxide is not particularly limited as long as it allows these components to be brought into contact with each other and reacted. For example, the method may include mixing an acid anhydride and hydrogen peroxide together to prepare an organic peracid, or alternatively adding dropwise an acid anhydride to hydrogen peroxide to prepare an organic peracid. More specifically, an acid anhydride such as acetic anhydride is mixed with hydrogen peroxide water, or an acid anhydride is added dropwise to hydrogen peroxide water, and then the reaction is allowed to proceed, whereby an organic peracid such as peracetic acid can be prepared. According to such a method, an organic peracid can be synthesized at a low temperature in a short time.

Preferably, 0.05 to 5 moles of hydrogen peroxide are added per mole of acid anhydride; more preferably, 0.1 to 2 moles of hydrogen peroxide are added in view of safety and efficiency. An amount less than 0.05 moles may result in a significant reduction in the conversion of the acid anhydride and is thus uneconomical. Also, an amount more than 5 moles may result in a significant reduction in the conversion of hydrogen peroxide and is thus uneconomical.

The heat of reaction between an acid anhydride and hydrogen peroxide allows the reaction therebetween to proceed at a low temperature. Thus, there is no particular need to control the reaction temperature. Yet, the lower limit temperature is preferably 5° C. or higher, and more preferably 10° C. or higher, whereas the upper limit temperature is preferably 40° C. or lower, and more preferably 35° C. or lower. At a temperature lower than the lower limit, the time to reach equilibrium may be too long. At a temperature higher than the upper limit, hydrogen peroxide and the resulting peracetic acid may decompose. Also, the reaction time is not particularly limited as long as the reaction proceeds. Yet, it preferably ranges from 5 minutes to 5 hours, and more preferably from 10 minutes to 1 hour.

It should be noted that since the reaction proceeds rapidly as described above, there is no particular need to add a reaction catalyst such as an acid (for example, an inorganic acid such as sulfuric acid) in preparing an organic peracid by reacting an acid anhydride with hydrogen peroxide in step (1). Preferably, 0.01 moles or less of, more preferably 0.001 moles or less of catalyst are added per mole of acid anhydride, although no catalyst may be added.

In step (2), the organic peracid prepared in step (1) is allowed to react with the rubber component in natural rubber latex, whereby the natural rubber is epoxidized. The epoxidation reaction can be performed by a known method. For example, the epoxidation may be performed by adding the organic peracid to natural rubber latex stabilized with a surfactant to react them. Once the organic peracid is mixed with natural rubber latex, the epoxidation reaction of the natural rubber latex starts to occur and then, if desired, the reaction may be suppressed or controlled by, for example, adjusting the temperature.

Natural rubber latex is collected as sap from natural rubber trees such as *Hevea* trees, and it contains, in addition to a rubber component, water, proteins, lipids, inorganic salts, and the like. The gel fraction in rubber is considered to be derived from a complex of various impurities contained in the rubber. Examples of natural rubber latexes that can be used include raw latex taken from *Hevea* trees by tapping (i.e., field latex), and concentrated latex prepared by centrifugation or creaming (e.g., purified latex, high ammonia latex containing ammonia added by a usual method, LATZ latex stabilized with zinc oxide, TMTD and ammonia). The dry rubber content in natural rubber latex is preferably 5 to 67% by mass, and more preferably 30 to 60% by mass.

The amount of organic peracid to be added is not particularly limited, and it may be appropriately determined according to a desired degree of epoxidation. By controlling the mixing ratio of an organic peracid to natural rubber, the desired degree of epoxidation can be achieved. The mixing ratio may be controlled by, for example, controlling the pump flow rate, and thus the synthesis can be performed continuously.

In the present invention, the degree of epoxidation of epoxidized natural rubber to be produced is not particularly limited, and it may be adjusted to any desired ratio. In considering the problems of material cost, effluent treatment, treatment of residual components in rubber, increase in loss, and the like, however, the degree of epoxidation is preferably 0.5 to 12.0 mol %, and more preferably 0.5 to 10.0 mol %.

A surfactant for stabilization may desirably be added to natural rubber latex. Preferred surfactants are nonionic surfactants. The cloud point of the nonionic surfactant is preferably 60° C. to 100° C. although it is not particularly limited as long as it does not disturb coagulation. Specific examples thereof include polyoxyethylene lauryl ether, polyoxyethylene alkyl ethers, polyoxyethylene alkylene alkyl ethers, polyoxyethylene distyrenated phenyl ether, polyoxyethylene tribenzyl phenyl ether, and polyoxyethylene fatty acid alcohols. While anionic surfactants can also be used, it is preferred to concurrently use a nonionic surfactant because a large amount of surfactant is necessary to prevent coagulation of latex during step (2) and thus the use of an anionic surfactant alone is uneconomical.

The amount of surfactant to be added is not particularly limited as long as it is an amount that can prevent coagulation of natural rubber latex. Yet, the amount is preferably 0.1 to 3 parts by mass relative to 100 parts by mass of dry natural rubber. Such a low amount of surfactant is also advantageous in a subsequent washing step.

The epoxidation reaction temperature is not particularly limited as long as the epoxidation proceeds. Yet, the lower limit thereof is 5° C., preferably 20° C., and more preferably 30° C., whereas the upper limit is 70° C., preferably 65° C., and more preferably 60° C. At a temperature lower than 5° C., the reaction may take too long a time. At a temperature higher than 70° C., natural rubber latex may coagulate or partially decompose. Also, the epoxidation reaction time is not particularly limited as long as the reaction proceeds. Yet, it preferably ranges from 1 to 120 minutes, more preferably from 10 to 60 minutes.

After completion of the epoxidation reaction, the epoxidized natural rubber latex obtained through the reaction is usually subjected to coagulation. The coagulating step can be carried out by a known method, for example, such as by using a coagulating agent such as methanol, or by passing water vapor in counterflow to heat the epoxidized natural rubber latex.

The obtained rubber is, if needed, appropriately subjected to a drying step, whereby an epoxidized natural rubber according to the present invention is obtained. As for the drying step, the drying method is not particularly limited. Dryers usually used for drying TSR can be used. The rubber may also be dried with hot air on a conveyor belt. Alternatively, microwave heating or heating under vacuum, although not common, may be used.

The drying temperature is not particularly limited. Usually, it is possible to dry the rubber at a room temperature or higher. Yet, in view of productivity, the drying temperature is 70° C. or higher, preferably 80° C. or higher, and more preferably 90° C. or higher. The upper limit is 140° C. or lower, preferably 135° C. or lower, and more preferably 130° C. or lower, because the rubber is likely to deteriorate at high temperatures. The drying time may be appropriately set such that no undried portions remain, depending on drying temperature. It should be noted that since the heat resistance of epoxidized natural rubber tends to be lower than that of normal natural rubber due to epoxidation, the drying temperature is preferably low as long as it does not impair productivity.

The epoxidized natural rubber produced by the production method of the present invention is useful particularly as a tire material.

When natural rubber is epoxidized, the resulting natural rubber has an increased glass-transition temperature. Specifically, an increase in the degree of epoxidation by 1% leads to an increase in glass-transition temperature by about 1 degree. In the case where the degree of epoxidation is high, the glass-transition temperature greatly increases, thus increasing the friction coefficient when wet and reducing the breaking distance in rain; while on the other hand, rolling resistance tends to increase, resulting in poor fuel economy; in addition, the rubber tends to become hard at low temperatures and thus become unsuitable for, for example, winter tires. In contrast, in the case where the degree of epoxidation is low, the epoxidized natural rubber has a reduced elastic modulus at low temperatures and thus can be suitably used for, for example, winter tires. Meanwhile, epoxidation increases the polarity of rubber, thus increasing affinity between rubber and silica used as filler and improving fuel economy. The epoxidized natural rubber according to the present invention has a sufficient affinity for silica even when the degree of epoxidation is low as described above, which allows for the reduction of glass-transition temperature. Thus, the epoxidized natural rubber of the present invention can be suitably used for, for example, winter tires.

The rubber composition for a tire containing the epoxidized natural rubber according to the present invention may include a rubber component containing the epoxidized natural rubber, and carbon black and/or white filler.

In the rubber composition, the amount of the epoxidized natural rubber based on 100% by mass of the rubber component is preferably 5% by mass or more, more preferably 50% by mass or more, and still more preferably 80% by mass or more, and it may be 100% by mass. If the amount is less than 5% by mass, silica, when added, may not be sufficiently dispersed.

The rubber component of the rubber composition may contain other rubber materials in addition to the epoxidized natural rubber. Examples of other rubber materials include natural rubber (NR), polyisoprene rubber (IR), polybutadiene rubber (BR), styrene butadiene rubber (SBR), styrene-isoprene-butadiene rubber (SIBR), ethylene-propylene-diene rubber (EPDM), chloroprene rubber (CR), and acrylonitrile butadiene rubber (NBR). In the case where the rubber composition contains the epoxidized natural rubber of the present invention and BR, for example, the amount of the epoxidized natural rubber based on 100% by mass of the rubber component is 5 to 90% by mass, preferably 10 to 50% by mass, with the amount of BR being 10 to 95% by mass, preferably 50 to 90% by mass.

The nitrogen adsorption specific surface area ($N_2SA$) of carbon black is preferably 50 $m^2/g$ or more, and more preferably 70 $m^2/g$ or more. Also, the nitrogen adsorption specific surface area is 125 $m^2/g$ or less, preferably 115 $m^2/g$ or less, and more preferably 45 $m^2/g$ or less. By using carbon black in the range mentioned above, physical properties such as rubber strength can be ensured.

The BET specific surface area of carbon black is determined in accordance with JIS K 6217-2:2001.

The rubber composition preferably contains silica as a white filler.

The nitrogen adsorption specific surface area ($N_2SA$) of silica is 80 $m^2/g$ or more, preferably 100 $m^2/g$ or more, and more preferably 120 $m^2/g$ or more. Also, the $N_2SA$ of silica is preferably 250 $m^2/g$ or less, and more preferably 200 $m^2/g$ or less. By using silica in the range mentioned above, physical properties such as fuel economy and rubber strength can be ensured.

The $N_2SA$ values of silica are determined by the BET method in accordance with ASTM D3037-93.

The amount of silica relative to 100 parts by mass of the rubber component is preferably 10 parts by mass or more, and more preferably 30 parts by mass or more. The amount is preferably 150 parts by mass or less, and more preferably 100 parts by mass or less. By using an amount falling within the range mentioned above, physical properties such as fuel economy and rubber strength can be ensured.

The rubber composition of the present invention may appropriately contain, in addition to the above materials, various materials generally used in the tire industry, such as zinc oxide, stearic acid, various types of antioxidants, sulfur, and vulcanization accelerators.

The rubber composition of the present invention can be prepared by a known method, for example, such as by mixing and kneading the components using a rubber kneading device such as an open roll mill or Banbury mixer, and subsequently vulcanizing the mixture. The rubber composition is usable for various tire components and particularly suitably for treads and the like.

A pneumatic tire according to the present invention can be formed from the rubber composition by a usual method. Specifically, an unvulcanized rubber composition containing various materials as needed is extruded in the form of a tire component such as a tread, and then subjected to tire building in a usual manner on a tire building machine to form an unvulcanized tire, which is then heat-pressed in a vulcanizer into a pneumatic tire.

EXAMPLES

The present invention is now more specifically described by reference to examples, but the present invention is not limited to these examples.

The chemical agents used in the examples are described below.
Natural rubber latex: Hytex (high ammonia type, natural rubber latex), available from Nomura Trading Co., Ltd.
Surfactant: EMULGEN 106 (nonionic emulsifier), available from Kao Corporation
Acetic anhydride: available from Wako Pure Chemical Industries, Ltd. (extra pure reagent; active ingredient: 93%)
Acetic acid: available from Wako Pure Chemical Industries, Ltd. (extra pure reagent; active ingredient: 98%)
Hydrogen peroxide water: available from Wako Pure Chemical Industries, Ltd. (active ingredient: 35%)
Methanol: available from Wako Pure Chemical Industries, Ltd. (extra pure reagent)
Sulfuric acid: available from Wako Pure Chemical Industries, Ltd. (active ingredient: 98%)
Ammonia: available from Wako Pure Chemical Industries, Ltd. (extra pure reagent; active ingredient: 25%)
BR: BR150B, available from Ube Industries, Ltd.
Carbon black: SHOBLACK N220 ($N_2SA$: 111 $m^2/g$), available from Cabot Corporation
Silica: ULTRASIL VN3, available from Evonik Degussa
Silane coupling agent: Si266 (bis(3-triethoxysilylpropyl) disulfide)
Zinc oxide: zinc oxide #2, available from MITSUI MINING & SMELTING CO., LTD.
Stearic acid: stearic acid beads "TSUBAKI", available from NOF Corporation
Calcium stearate: calcium stearate GF-200, available from NOF Corporation
Oil: palm oil olein
Sulfur: 5% oil-containing sulfur
Vulcanization accelerator CZ: Nocceler CZ (N-cyclohexyl-2-benzothiazolylsulfenamide), available from Ouchi Shinko Chemical Industrial Co., Ltd.
Vulcanization accelerator DPG: Nocceler D, available from Ouchi Shinko Chemical Industrial Co., Ltd.

<Evaluation>

The physical properties of the raw rubbers and vulcanized rubber sheets prepared in the examples were evaluated by the methods mentioned later. Table 1 shows the results. The vulcanized rubber sheets were prepared by the following method.

(Preparation of Vulcanized Rubber Sheet)

According to each of the formulations shown in Table 1, the chemical agents except the sulfur and vulcanization accelerators were mixed and kneaded together using a 1.7 L-Banbury mixer. Next, the sulfur and vulcanization accelerators were added and kneaded into the kneaded mixture using a roll. Thus, an unvulcanized rubber composition was obtained. The unvulcanized rubber composition was press-vulcanized at 170° C. for six minutes to prepare a vulcanized rubber sheet.

(Measurement of the Degree of Epoxidation)

The obtained epoxidized natural rubber was mixed and kneaded for one minute using a roll. Subsequently, several samples were taken from several portions of the rubber and dissolved in toluene, followed by reprecipitation in methanol and then drying. The resulting (purified) products were used as specimens. The measurement was performed using a $^1$H-NMR device (JNM-ECA series, available from JEOL Ltd.).

The degree of epoxidation (%) was calculated by the following equation.

Degree of epoxidation (%)=$B/(A+B)\times100$ where A represents an integral of peaks (5.0-5.2 ppm) from the protons of the cis form, and B represents an integral of peaks (2.6-2.8 ppm) from the protons of the epoxy group.

(Rubber Strength)

No. 3 dumbbell-shaped rubber test pieces were prepared from the obtained vulcanized rubber sheet, and a tensile test was carried out in accordance with JIS K 6251 "Rubber, vulcanized or thermoplastic—Determination of tensile stress-strain properties" to measure the tensile strength at break (TB) and the elongation at break (EB). Then, a product of TB×EB was calculated, and expressed as an index relative to the rubber strength (TB×EB) in Comparative Example 1 (=100), using the following equation. The higher the index, the higher the rubber strength.

(Rubber strength index)=(*TB*×*EB* of each formulation)/(*TB*×*EB* in Comparative Example 1)×100

(Dispersion of Silica)

The obtained vulcanized rubber sheet was measured for degree of dispersion of silica in accordance with the ASTM D2663-B method, which is a method for measuring the degree of dispersion of carbon black. The higher the value, the better the dispersion. The highest value is 100%.

EXAMPLES AND COMPARATIVE EXAMPLES

Example 1

First, 35% hydrogen peroxide (97.5 g) and water (97.5 g) were mixed, acetic anhydride (102 g) was added to the mixture, and the resulting mixture was stirred with a magnetic stirrer for about 30 minutes while adjusting the reaction temperature to 20-30° C. using ice water to prepare peracetic acid. Then, a surfactant (2 phr) and water were added to natural rubber latex (480 g, solids content: 60%) to adjust the solids content to 30%. After stirring the latex for 10 minutes with a stirring propeller, the peracetic acid was slowly added, and they were then reacted by stirring for 30 minutes with the stirring propeller while adjusting the reaction temperature using ice water so that it would not exceed 40° C. Subsequently, the resulting mixture was coagulated in methanol and formed into a thin sheet, which was then immersed in water overnight. After washing again with water, the sheet was dried to a constant mass, thus providing an epoxidized natural rubber.

Example 2

First, 35% hydrogen peroxide (97.5 g) and water (97.5 g) were mixed, acetic anhydride (102 g) was added dropwise to the mixture at a flow rate of 10 ml/min (dropwise addition time: 30 minutes), and the resulting mixture was stirred with a magnetic stirrer for about 30 minutes after the dropwise addition, while adjusting the reaction temperature to 20-30° C. using ice water to prepare peracetic acid. Then, a surfactant (2 phr) and water were added to natural rubber latex (480 g, solids content: 60%) to adjust the solids content to 30%. After stirring the latex for 10 minutes with a stirring propeller, the peracetic acid was slowly added, and they were then reacted by stirring for 30 minutes with the stirring propeller while adjusting the reaction temperature using ice water so that it would not exceed 40° C. Subsequently, the resulting mixture was coagulated in methanol and formed into a thin sheet, which was then immersed in water overnight. After washing again with water, the sheet was dried to a constant mass, thus providing an epoxidized natural rubber.

Comparative Example 1

Peracetic acid was prepared by mixing 35% hydrogen peroxide (97.5 g), acetic acid (30 g), and sulfuric acid (2 g) and allowing the mixture to stand at 40° C. for one day. Then, a surfactant (2 phr) and water were added to natural rubber latex (480 g, solids content: 60%) to adjust the solids content to 30%. After stirring the latex for 10 minutes with a stirring propeller, the peracetic acid was slowly added, and they were reacted by stirring for 30 minutes with the stirring propeller while adjusting the reaction temperature to 60° C. using a heater and a controller. Subsequently, the resulting mixture was coagulated in methanol and formed into a thin sheet, which was then immersed in water overnight. After washing again with water, the sheet was dried to a constant mass, thus providing an epoxidized natural rubber.

Comparative Example 2

Peracetic acid was prepared by mixing 35% hydrogen peroxide (97.5 g), acetic acid (15 g), and sulfuric acid (2 g) and allowing the mixture to stand at 40° C. for two days. Then, a surfactant (2 phr) and water were added to natural rubber latex (480 g, solids content: 60%) to adjust the solids content to 30%. After stirring the latex for 10 minutes with a stirring propeller, the peracetic acid was slowly added, and they were then reacted by stirring for 30 minutes with the stirring propeller while adjusting the reaction temperature to 60° C. using a heater and a controller. Subsequently, the resulting mixture was coagulated in methanol and formed into a thin sheet, which was then immersed in water overnight. After washing again with water, the sheet was dried to a constant mass, thus providing an epoxidized natural rubber.

TABLE 1

|  |  | Example 1 | Example 2 | Comparative Example 1 | Comparative Example 2 |
|---|---|---|---|---|---|
| Preparation of epoxidized natural rubber | 35% Hydrogen peroxide | 1 mol | 1 mol | 1 mol | 1 mol |
|  | Acetic anhydride | 1 mol | 1 mol | — | — |
|  | Acetic acid | — | — | 0.5 mol | 0.25 mol |
|  | Concentration of hydrogen peroxide | 17.5 wt % | 17.5 wt % | 35 wt % | 35 wt % |
|  | Catalyst | none | none | sulfuric acid (2 g) | sulfuric acid (2 g) |
|  | Addition method | Mixing together | Dropwise addition of acetic anhydride | Mixing together | Mixing together |
|  | Temperature for preparing peracetic acid | 20-30° C. | 20-30° C. | 40° C. | 40° C. |
|  | Time for preparing peracetic acid | 30 min | 1 hour | 1 day | 2 days |
|  | Time for reaction with latex | 30 min | 30 min | 30 min | 30 min |
|  | Temperature for reaction with latex | 20-40° C. | 20-40° C. | 60° C. | 60° C. |
|  | Degree of epoxidation | 10% | 10% | 10% | 10% |
| Formulation (parts by mass) | Soid rubber prepared in Example 1 | 30 | — | — | — |
|  | Soid rubber prepared in Example 2 | — | 30 | — | — |
|  | Soid rubber prepared in Comparative Example 1 | — | — | 30 | — |
|  | Soid rubber prepared in Comparative Example 2 | — | — | — | 30 |
|  | BR | 70 | 70 | 70 | 70 |
|  | Carbon black | 5 | 5 | 5 | 5 |
|  | Silica | 55 | 55 | 55 | 55 |
|  | Silane coupling agent | 4.5 | 4.5 | 4.5 | 4.5 |
|  | Oil | 21 | 21 | 21 | 21 |
|  | Zinc oxide | 3 | 3 | 3 | 3 |
|  | Stearic acid | 2 | 2 | 2 | 2 |
|  | Calcium stearate | 6 | 6 | 6 | 6 |
|  | Sulfur (containing 5% of oil) | 1.58 | 1.58 | 1.58 | 1.58 |
|  | Vulcanization accelerator CZ | 1.8 | 1.8 | 1.8 | 1.8 |
|  | Vulcanization accelerator DPG | 1.2 | 1.2 | 1.2 | 1.2 |
| Evaluation | Dispersion of silica | 98 | 98 | 98 | 98 |
|  | Rubber strength index | 100 | 100 | 100 | 100 |

In the examples in which acetic anhydride was used, epoxidized natural rubber was produced in a very short time compared with the comparative examples, and a catalyst was not necessary for the reaction between acetic anhydride and hydrogen peroxide. It was also demonstrated that the degree of dispersion of silica and the rubber strength of the epoxidized natural rubbers obtained in the examples were equivalent to those obtained in the comparative examples.

The invention claimed is:
1. A method for producing epoxidized natural rubber, the method comprising:
   step (1) of providing a mixture consisting of an acid anhydride, 0.1 to 2 moles of hydrogen peroxide per mole of the acid anhydride, and water and maintaining the mixture at a temperature of 5° C. to 40° C. for 5 minutes to 5 hours, to prepare an organic peracid; and
   step (2) of epoxidizing natural rubber latex with the obtained organic peracid.

2. The method according to claim 1,
wherein step (1) comprises mixing the acid anhydride and the hydrogen peroxide together to prepare the organic peracid.

3. The method according to claim 1,
wherein step (1) comprises adding dropwise the acid anhydride to the hydrogen peroxide to prepare the organic peracid.

4. The method according to claim 1,
wherein the acid anhydride is acetic anhydride, and the organic peracid is peracetic acid.

5. The method according to claim 1,
wherein the epoxidized natural rubber has a degree of epoxidation of 0.5 to 12 mol %, and the hydrogen peroxide has a concentration of not more than 20% by mass.

\* \* \* \* \*